Patented Jan. 31, 1933

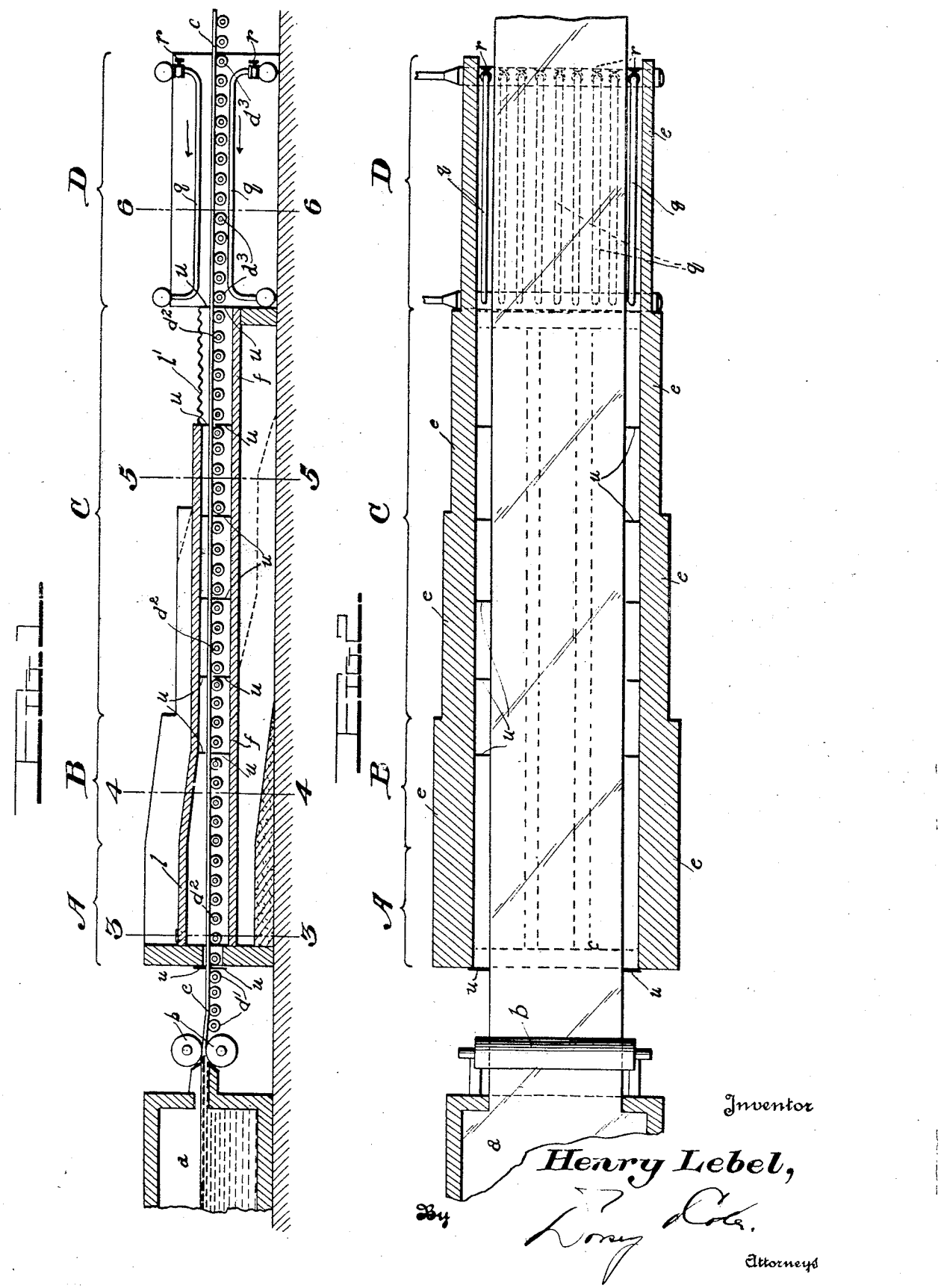

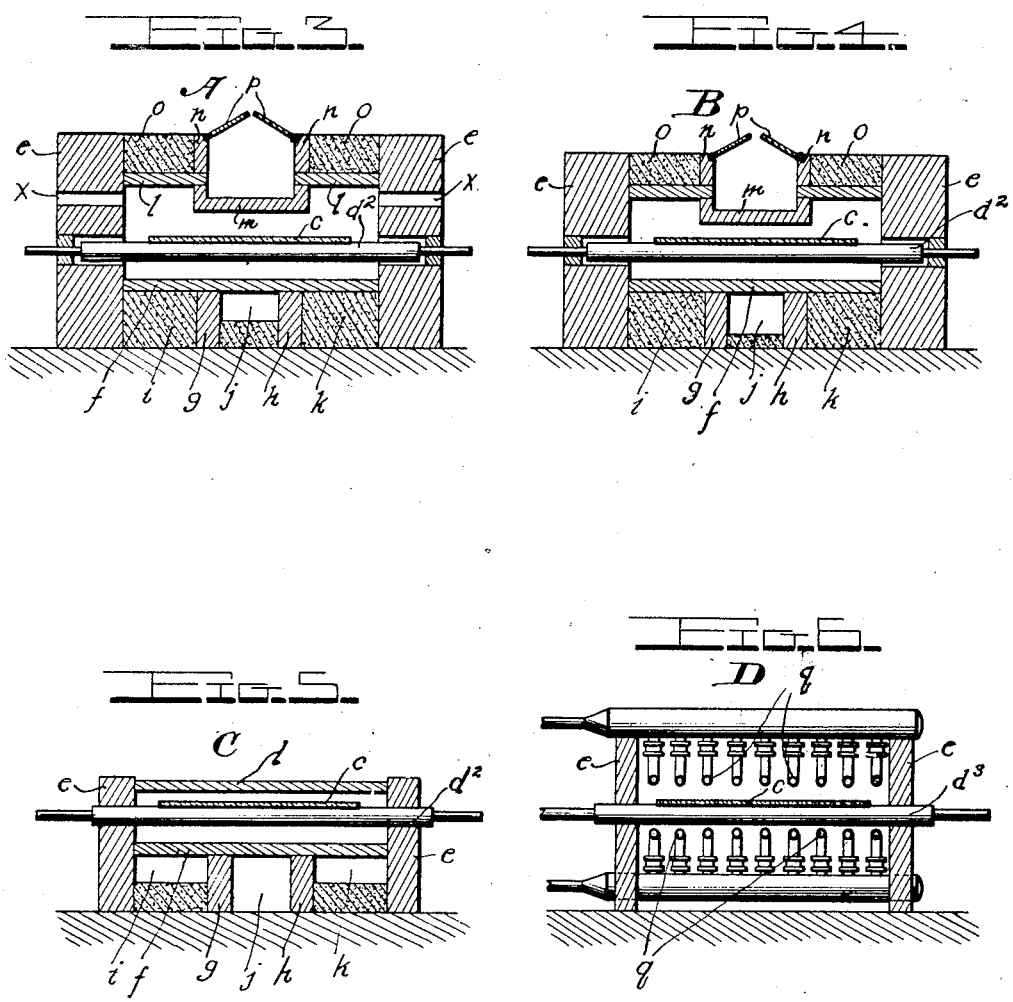

1,895,547

UNITED STATES PATENT OFFICE

HENRY LEBEL, OF PARIS, FRANCE, ASSIGNOR TO SOCIÉTÉ ANONYME DES MANUFACTURES DES GLASES & PRODUITS CHIMIQUES DE SAINT GOBAIN, CHAUNY & CIREY, OF PARIS, FRANCE

APPARATUS FOR ANNEALING GLASS

Application filed January 30, 1930, Serial No. 424,669, and in France February 7, 1929.

This invention relates to a method and apparatus for annealing glass, and particularly a continuous sheet of glass.

In the formation of sheet glass and in its transfer to the lehr, there are produced variations in temperature between different parts of the sheet, thereby setting up local stresses, particularly along the edge of the sheet, which can only be overcome by reheating the sheet to regain the evenness of temperature throughout the entire sheet.

This reheating of the sheet prior to its annealing is a costly operation, because of the cost of the fuel involved, and because of the structure and length of lehr necessary to obtain a proper reheating. The object of this invention is to avoid the disadvantages pointed out above, in that said invention provides for using and redistributing the heat units stored in the sheet of glass when it is received from the forming machine at the entrance end of the lehr in conjunction with heat which is in the receiving end of the lehr. The structure provides for a proper regulation and the redistribution of the heat units which are irregularly distributed in the sheet and for a uniform and progressive loss of the heat within the sheet as soon as the equalities of temperature is established within the sheet to be annealed. The structure to accomplish this, is shown in the accompanying drawings in which,—

Figure 1 is a longitudinal section of a forming device and lehr embodying my invention.

Figure 2 is a sectional plan view thereof.

Figure 3 is a transverse section on line 3—3 of Figure 1.

Figure 4 is a transverse section on the line 4—4 of Figure 1.

Figure 5 is a transverse section on the line 5—5 of Figure 1; and

Figure 6 is a transverse section on the line 6—6 of Figure 1.

In Figure 1, $a$ is a melting tank having in close proximity thereto the forming apparatus $b$, which forms the continuous sheet of glass $c$. The sheet of glass to be annealed is conducted from the forming rolls to the lehr, which is in close relation thereto, so as to conserve the initial heat with the sheet of glass on the conveying rollers comprising a series $d^1$. A series of rollers $d^2$, extending through the entire length of the lehr, and another series of rolls $d^3$, in connection therewith, takes the glass from the lehr. The lehr is divided into the several longitudinal sections, all of which are of different construction, so as to treat the sheet of glass in a different manner throughout its trip through the lehr. At the entrance end of the lehr are the heating sections A and B, in which are the openings $x$, through which heat may be injected to bring the sheet of glass to the necessary temperature to anneal it if it be a very thin sheet of glass, or to heat the lehr at the beginning of a run. In the section C of the lehr, the temperature of the glass is gradually decreased, while in the section D, the glass is exposed to artificial cooling means, prior to the sheet being exposed to atmospheric temperature. $e$ are the side walls of the lehr housing which progressively decrease in thickness to afford decreasing insulation on the sides of the sheet as it moves toward the exit end of the lehr. Within the side walls $e$ of the lehr below the supporting rollers $d^2$, is the flooring $f$, supported on the uprights $g$ and $h$, thus forming three horizontal channels $i$, $j$ and $k$, running the length of the lehr sections A, B and C, under the floor of the lehr. The size of the channel $j$ under the center of the lehr, progressively increases from the entrance end of the lehr towards the exit end of the lehr, while the channels $i$ and $k$, which are open under the section C, progressively increase in size towards the exit end of the lehr. In the sections A and B, the channels $i$ and $k$ are filled with insulating material. The roof $l$ of the lehr, in the sections A, B, and part of C, is of peculiar construction, and will be now described. Above the conveying rollers $d^2$, and between the side walls of the lehr $e$, the roof $l$ has the downward projection $m$ over the center of the conveying rollers. This projection $m$ in the roof, gradually lowers towards the supporting rollers until in the section C, where it is flat through its entire distance over the rollers. The roof over the other part of the section C of the lehr, is also flat and is made of corrugated metal $l'$. Where the roof is flat, it is very close to the sheet of glass. Above the roof $l$ in the lehr sections A and B, are the masonry blocks $n$ which, with the several covers $p$, form a conduit which can be opened to atmospheric temperature. Through this construction, the center of the sheet can be exposed to radiation in varying degrees. Above the roof $l$ and the side walls of the lehr $e$, is the insulating material $o$, which gradually decreases from the entrance end of the lehr towards the exit end of the lehr, and entirely disappears in the lehr section C. Above and below the supporting rollers $d^3$ of the lehr section D, are the pipes $q$, having valves $r$ interposed between the pipes and the source of supply of the cooling medium. These pipes $q$ run parallel with the sheet of glass which passes over or under them as the case may be. Their function is to chill the glass prior to its reception into normal atmospheric temperature. The travel of the cooling fluid in the pipes should be the reverse of the movement of the sheet of glass through the lehr. The flow of the cooling medium can be regulated in each pipe separately so as to correct inequalities of cooling which may arise in different parts in the same plane transverse of the sheet. The construction of the lehr in the section D, comprises only the supporting rollers $d^3$ and the side walls $e$, and the cooling pipes $q$.

Through the length of the lehr and especially at the entrance and exit end of the lehr are movable fire-proof curtains or dampers $u$, which retain the heat within the lehr and exclude cold air from the lehr. The dampers or curtains throughout the length of the lehr have the advantage of dividing the lehr into a series of sections so that different temperatures can be maintained within the several sections separated by the curtains or dampers.

From the above it will be seen that I provide a lehr having sections in which three different operations take place, namely, the reheating and redistributing of the retained heat units within the newly formed sheet of glass; the gradual uniform decrease of these heat units, and lastly, the means for subtracting uniformly the heat units to that of ordinary atmospheric temperature. The heating or cooling in the sections is further controlled to a nicety by the construction of the lehr, so that the heating or reduction of temperature in any one section may vary in a cross section thereof. The reheating is accomplished in the sections A and B, by the heat within the sheet and from that retained in that section of the lehr through the conservation of heat from hot glass that has preceded the glass being reheated, and cooled in the section C, in a decreasing manner, because of decrease in insulation in certain parts in that section of the lehr and positively cooled as a unit in the section D, by regulating the temperature which passes over and under the sheet.

It is to be noted here that the insulation within each of the sections is different, and that transverse sections differ from one another, in that they are provided with walls of different insulation, and that the walls of certain sections and parts of the lehr are given such shapes that the movements of the heated air in contact with the glass are reduced as much as possible by these constructions.

Having thus described my invention what I claim as new, and desire to secure by Letters Patent is:—

1. A glass annealing lehr, means for conveying glass through said lehr, a roof over said conveying means which near the entrance end of the lehr is lower in the longitudinal center over the conveying means than along the edges thereof, and progressively descends toward the exit end of the lehr and insulation on each side of said lower portion of said roof which also progressively decreases toward the exit end of the lehr.

2. The combination with a lehr structure for sheet glass having a cooling channel in its top and in its bottom adjacent to its entrance end, located in the medial longitudinal vertical plane of the lehr and having insulation on each side of said channels along the edges of the top and bottom of the lehr, of a conveyor for moving the sheet through the lehr.

3. The combination with a lehr structure having a roof, the medial longitudinal portion of which near the entrance end of the lehr is lower than the portions on each side thereof, of a conveyor for feeding sheet glass through the lehr.

4. The combination with a lehr structure having a roof, the medial longitudinal portion of which near the entrance end of the lehr is lower than the portions on each side thereof, the said roof in the successive sections of the lehr being progressively lower, of a conveyor for feeding sheet glass through the lehr.

5. The combination with a lehr structure having a roof, the medial longitudinal portion of which near the entrance end of the lehr is lower than the portions on each side thereof, the difference in height between the medial and side portions being less at the succeeding portions of the lehr, of a conveyor for feeding sheet glass through the lehr.

6. A glass annealing lehr having in its bottom central longitudinal and side longitudinal channels, the said channels increasing in vertical depth towards the exit end of the lehr.

7. A glass annealing lehr having in its bottom central longitudinal and side longitudinal channels, the said channels increasing in vertical depth towards the exit end of the lehr, and the side channels starting further along the lehr than does the central channel.

8. In a glass annealing lehr, means for conveying glass through said lehr, a roof over said conveying means which near the entrance end of the lehr is lower in the longitudinal center over the conveying means than along the edges thereof, and means for varying the temperature of the bottom of said lower portion of the roof.

9. In a glass annealing lehr, means for conveying glass through said lehr, a roof over said conveying means which near the entrance end of the lehr is lower in the longitudinal center over the conveying means than along the edges thereof and adjustable panels in the lower portion of the roof of the median longitudinal channel so formed to control the rate of cooling in said channel.

In testimony whereof I hereunto affix my signature.

HENRY LEBEL.